E. N. DARROW.
GYROSCOPE.
APPLICATION FILED JUNE 23, 1911.
1,075,770.
Patented Oct. 14, 1913.
4 SHEETS—SHEET 1.
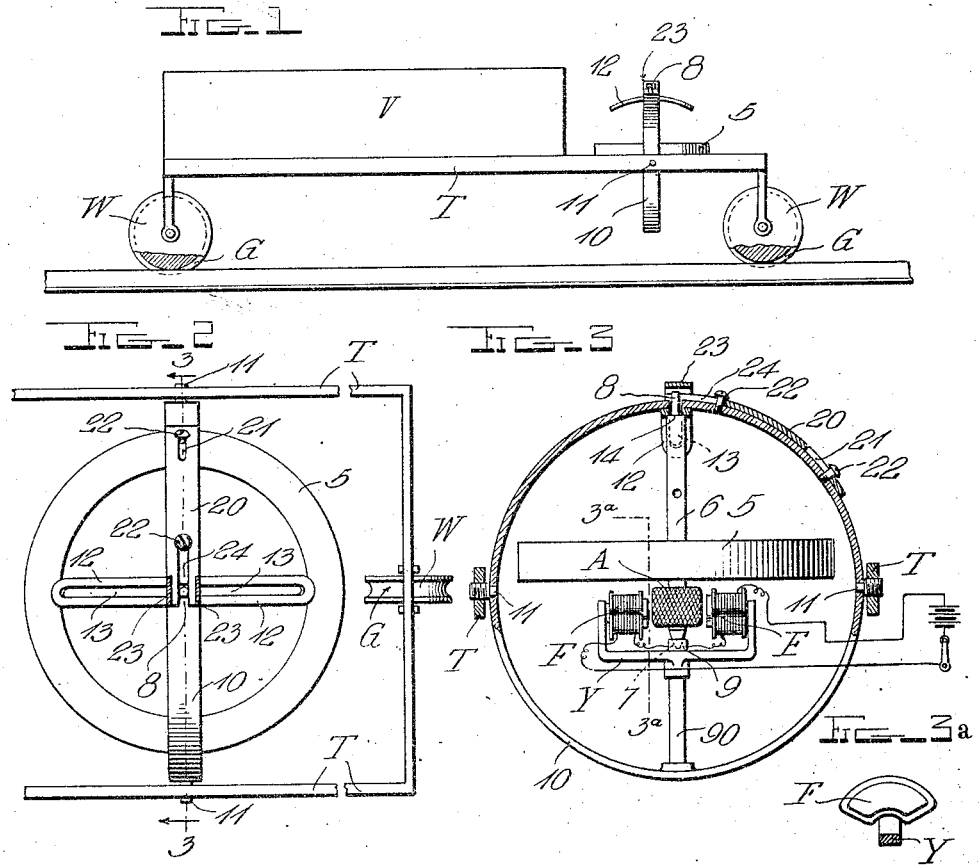
Witnesses
Inventor
E. N. Darrow
Attorneys

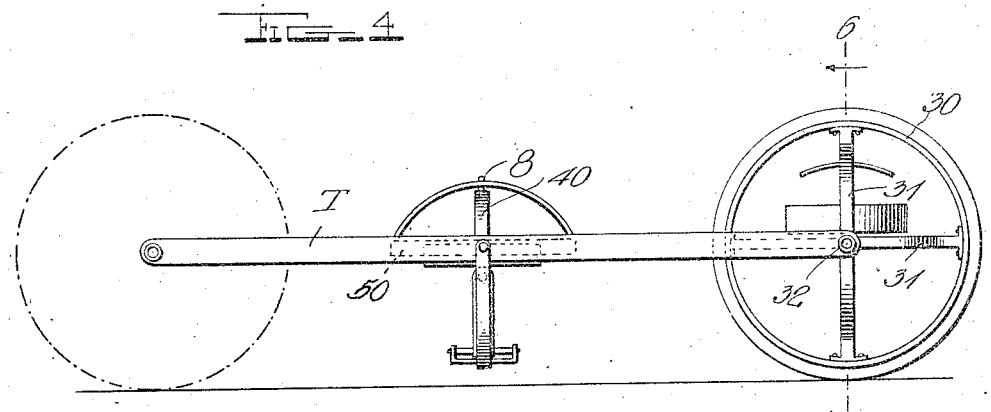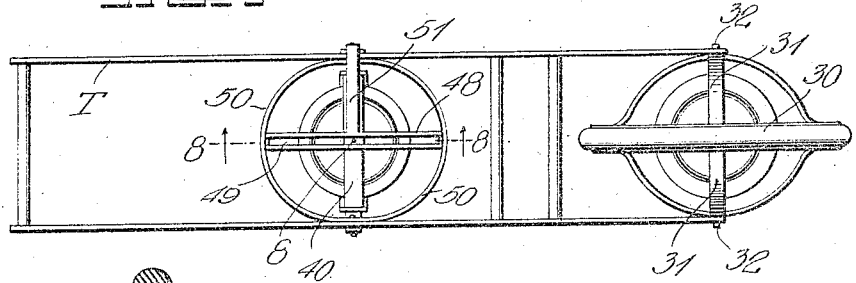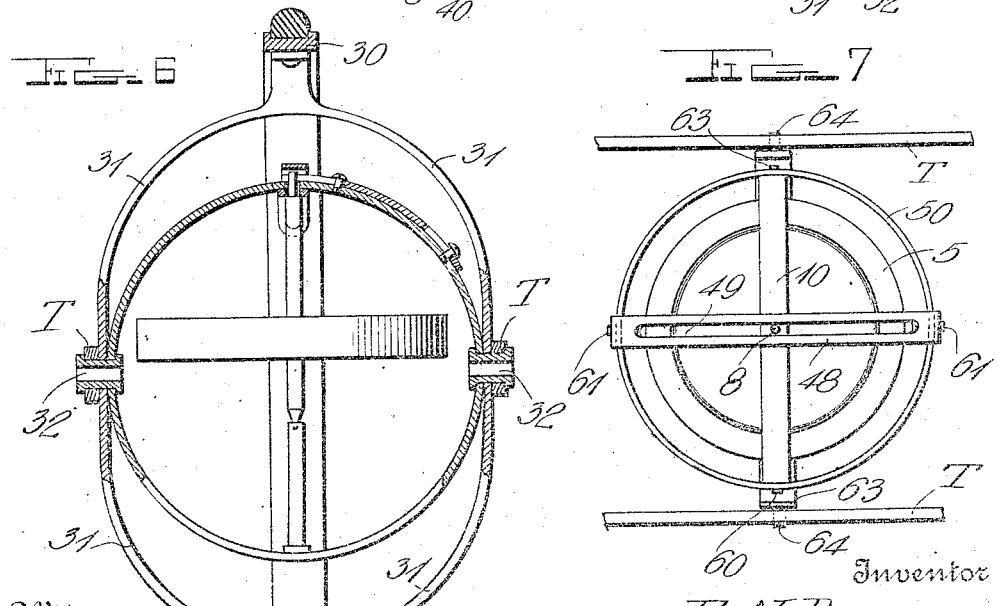

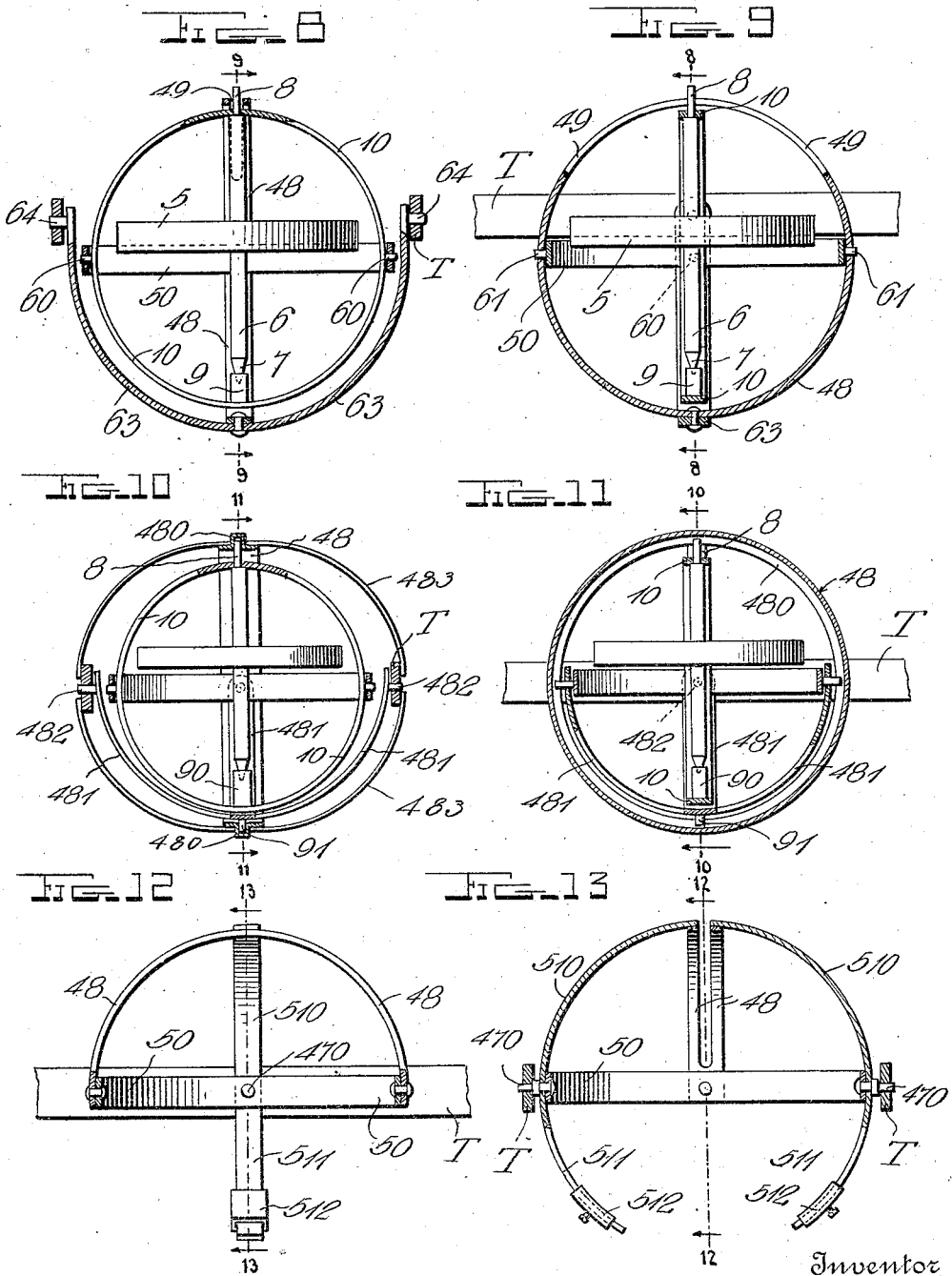

E. N. DARROW.
GYROSCOPE.
APPLICATION FILED JUNE 23, 1911.
1,075,770.
Patented Oct. 14, 1913.
4 SHEETS—SHEET 4.
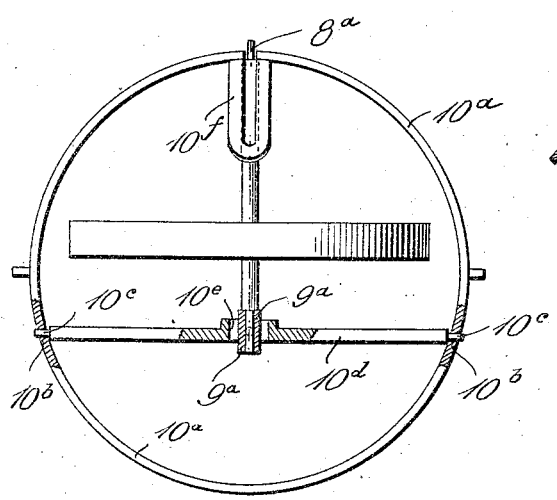
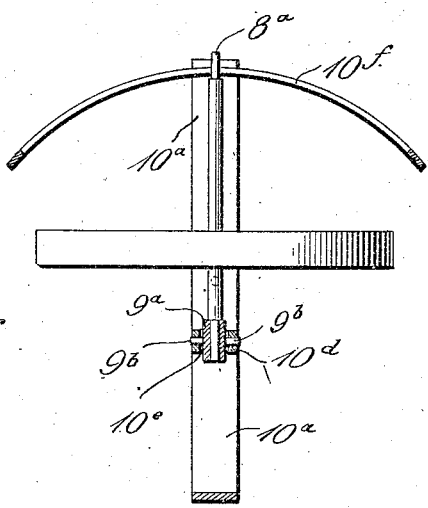
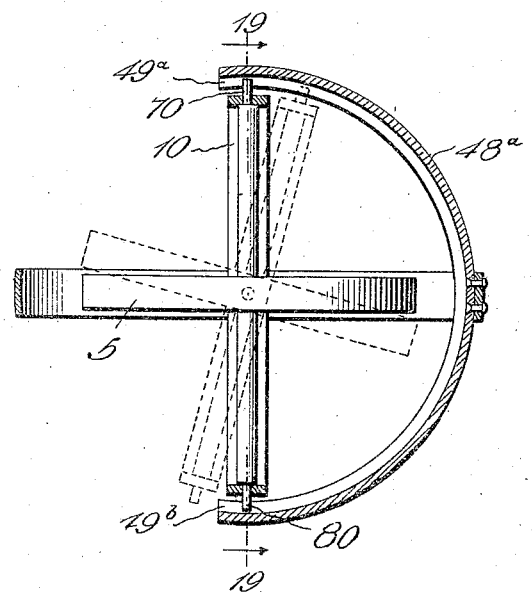
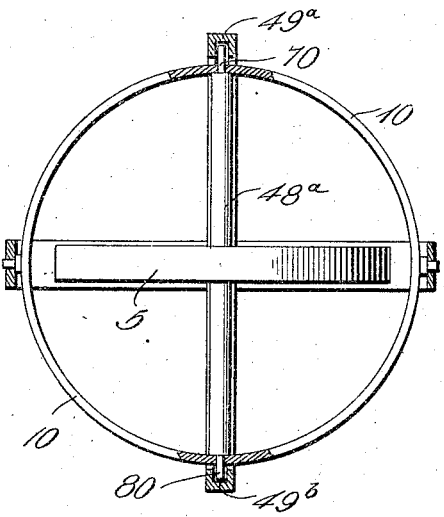
Witnesses
Inventor
E. N. Darrow
by H. R. Willson &co
Attorneys

UNITED STATES PATENT OFFICE.

EDWARD N. DARROW, OF HOMER, MICHIGAN.

GYROSCOPE.

1,075,770.  Specification of Letters Patent.  Patented Oct. 14, 1913.

Application filed June 23, 1911. Serial No. 634,929.

*To all whom it may concern:*

Be it known that I, EDWARD N. DARROW, a citizen of the United States, residing at Homer, in the county of Calhoun and State of Michigan, have invented certain new and useful Improvements in Gyroscopes; and I do declare the following to be a full, clear, and exact description of the invention, such as will enable others skilled in the art to which it appertains to make and use the same.

This invention is an apparatus for steadying or balancing any upright support which stands on one of its edges and is therefore unstable to the extent that it may tip from side to side or in a direction at right angles to the length of said edge. In the practical use of this invention, it is applied for steadying or balancing vehicles, and by the term "vehicle or truck" I desire at the outset to be understood as including any conveyance which travels on land or upon a track on the surface of the earth, or below or above said surface, any boat which travels upon or beneath the surface of the water, or any air craft—the idea being that it is the purpose of the present invention to steady or balance such a support or vehicle as against its tendency to tip from side to side. This tendency is not present in conveyances which travel upon wheels whereof at least two are disposed out of alinement with each other, or more strictly speaking the tendency is overcome by such wheels and hence when my invention is applied to a land conveyance it will be on one wherein the wheels are arranged tandem after the style of an ordinary bicycle. I have therefore given the invention the title of "gyrocycle" and in the following specification I have described it as relating to a land conveyance, reserving the right to apply it to other kinds of vehicles as above set forth or to any support standing on its edges.

The object of the invention is to prevent the support from tipping from one side to the other by utilizing the force of a constantly spinning fly wheel which is mounted in the support (and preferably in its own frame) on the gyroscopic principle. I am aware that heretofore it has been proposed to steady a vehicle of this kind by means of a gyroscope located within a frame which was pivoted to the vehicle truck above its center of gravity so that the gyroscope or fly wheel practically hung suspended and it's own weight or gravity tended to restore its axis to a vertical position when it was swung out of the same. I have discovered, however, that when a gyroscope is mounted or supported within its frame in such way that it may be said to be top-heavy, and when not spinning it would fall over to either side; if its upper trunnion be left free to move or possibly only partly retarded in its movement, when spinning it will not only right itself and restore its axis to a true vertical if deflected therefrom, but it will also right its frame and the parts connected therewith. The present invention which is an improvement on my patent issued May 9, 1911, and numbered 991,485, covers a practical application of this principle to the steadying of a two-wheeled vehicle by connecting the gyroscope frame with the vehicle truck in a number of ways set forth in the following specification and shown in the drawings in which—

Figure 1 is a diagrammatic side elevation of a car mounted on tandem wheels (which is the equivalent of a support standing on edge) and showing the application of my invention; Fig. 2 is a plan view of the gyroscope and adjacent parts of the vehicle truck, certain parts being broken away; Fig. 3 is a vertical section on the line 3—3 of Fig. 2; Fig. 3ª is a sectional detail on the line 3ª—3ª of Fig. 3; Fig. 4 is a side elevation of a gyrocycle having two gyroscopes; Fig. 5 is a plan view thereof; Fig. 6 is a vertical section on the line 6—6 of Fig. 4; Fig. 7 is a plan view of a modified form of the gyroscope; Fig. 8 is a transverse section through this modification, taken on the line 8—8 of Fig. 9; Fig. 9 is a central vertical longitudinal section on the line 9—9 of Fig. 8; Fig. 10 is a transverse section of another modified form of gyroscope, taken on the line 10—10 of Fig. 11; Fig. 11 is a central vertical longitudinal section on the line 11—11 of Fig. 10; Fig. 12 is a central vertical longitudinal section of another modified form, taken on line 12—12 of Fig. 13; Fig. 13 is a transverse section on the line 13—13 of Fig. 12. Figs. 14 and 15 are respectively a front elevation and a central longitudinal sectional view through another modification of my invention. Figs. 16 and 17 are also a front elevation and a longitudinal section of yet another modification, these views illustrating a construction which shows that it is possible to have both trunnions of the wheel axle stand within guides when said axle is upright, but to have one of them move out of its guide as soon as the axle tips a little either to the front or to the rear.

Broadly speaking, the fundamental principle of my invention is illustrated in Figs. 1, 2, 3, and 3ª, the two former omitting the motor entirely and the last two showing it diagrammatically only for sake of illustration. The support is shown as a vehicle body V mounted on a truck T which is illustrated in outline and supported by front and rear wheels W which stand one behind the other in tandem fashion, and will have suitable tires and steering mechanism if the device be a bicycle or motor cycle although the latter would also have its motor (not shown), and if the rim or tire of each wheel is grooved as shown at G the device becomes a monorail car and will have its own motor but will need no steering device. The purpose of the present invention is to cause such a vehicle to stand upright in a state of equilibrium on its two tandem wheels, and this purpose I accomplish by employing a fly wheel and its axle constructed and supported on the gyroscopic principle as will be explained. The gyroscope in this case consists of a horizontally disposed fly wheel 5 having considerable weight and an upright fixed axle 6 whose lower extremity is rather short and pointed as at 7 and whose upper extremity or trunnion 8 is somewhat longer, the former resting in a step-bearing 9 which rises a considerable distance from the bottom of a circular or oval frame 10 whose horizontally opposite points are pivoted as at 11 within the support (hereinafter called the truck T), the construction being such that the fly wheel when in place will stand above a horizontal line drawn through said pivots 11 and therefore the entire gyroscope becomes what might be called "top heavy." The circular or oval frame is continuous as shown, and stands in a plane at right angles to the longitudinal line of the support and normally vertical, and at its top it carries a plate 12 rigidly attached to the frame itself and extending forward and backward of it in a plane along the center of the vehicle truck or support, in which line this plate is slotted as at 13 to provide a guide for the upper trunnion of the axle. The slot in this case extends downward toward the extremities of said plate which are curved downward both forward and backward from the point of attachment with the frame for some little distance as shown.

With the parts thus far described, if the device were a toy the gyroscope might be spun by hand and while spinning it would right itself longitudinally of the vehicle and right the frame and the vehicle transversely of the line of progress, so that its efficacy would be preserved until its momentum was exhausted. In the practical application of this invention to a vehicle of any kind, however, it becomes necessary to rotate the wheel by means which form no essential part of the present invention, but which I will illustrate diagrammatically and theoretically for purposes of explanation. Referring then to Figs. 3 and 3ª wherein one form of electric motor is shown which might well be applied to the various forms of this device, A designates the armature fast upon the lower end of the axle 6 and rotating between the magnetic fields F of the motor, the latter being supported by a yoke Y which in turn may well be carried by the post 90 which supports the step-bearing 9. The wiring need not be shown, and the motor is much like those ordinarily employed excepting perhaps that its field should curve as seen in Fig. 3ª so as to permit the axle 6 of the wheel to swing back and forth over its bearing within the step 9. By the use of this or any equivalent practical motor which will drive the fly wheel at a proper rate of speed, it will be found that when the parts are properly proportioned and the wheel has the proper weight and speed of rotation, it will right itself so that its axle stands truly vertical while it is spinning and the vehicle is idle or progressing forward; but when the latter tips to either side the upper trunnion of the gyroscopic wheel will move slowly forward or backward in its guide as the case may be, with the result that the gyroscopic force thus set up will right the vehicle as against its lateral deflection to a true state of upright equilibrium and then the gyroscopic wheel will right itself as against its longitudinal deflection, the rotation of the fly wheel and the progress of the vehicle being unimpeded.

In connection with the mechanism above described, certain mechanical details will probably be required. For instance, the step-bearing in which the lower trunnion of the wheel is mounted may well be provided with some ball bearing (not shown) to reduce friction; in order to prevent the wheel from jumping out of this bearing and becoming displaced through irregularities in the roadway over which the vehicle travels, some means for holding it in place should be provided, such as the shoulder 14 on its upper trunnion which may travel beneath the plate 12 at either side of the guide slot therein; and for starting the gyroscope some means may be provided for holding its upper trunnion at the center of the length of the guide slot, such for instance as now to be described.

In Figs. 2 and 3 is shown a gravity catch 20 whose curved body lies over and slides upon one side of the frame of the gyroscopic wheel and has slots 21 engaged by pins or screws 22 rising from said frame. The upper and inner end of this catch has a box or head 23 provided in its lower side with a groove or slot 24 extending longitudinally of the catch and at right angles to the guide slot above described, and this groove is of a width to loosely receive the upper trunnion of the wheel. In order to start the latter, the catch is moved manually upward so that its groove or guide crosses the plate 12 at right angles to the slot 13 in the latter and the upper trunnion of the fly wheel stands in both, then the motor is started or the electric current switched on, and after the wheel has been speeded up to a proper point, the catch is released and drops back so that its box moves off the plate and its guide releases the upper trunnion of the wheel which latter is therefore free to move backward or forward in the manner above described. I call this detail a "starting device" because some such mechanism is necessary to hold the axle of the fly wheel upright when it is stationary and its top-heavy condition would cause it to fall over; the mechanism is also necessary when this wheel is being started, and it must be of such character that it falls or moves out of position after the wheel is started and when the gyroscopic action takes place. It is to be understood, however, that I do not confine myself to the details of construction just set forth, but this illustration and description is given merely to show one form of starting device which may well be employed in connection with the broad principle of my invention. After the wheel is running and this catch falls out of engagement with its upper trunnion, the latter moves forward and backward within the slot in the guide which should be sufficiently wide to permit freedom of movement but sufficiently narrow to cause the upper trunnion to contact with one of its edges, according to which way the vehicle tips, as I consider this frictional contact necessary to the successful operation of the gyroscope for the purposes to which it is put in this connection.

In Figs. 4, 5 and 6 I have shown an amplification of my broad idea to the extent of illustrating both that the vehicle may contain a plurality of gyroscopes and that one of them might be mounted within one of the wheels thereof. Herein the frame or truck of the vehicle is designated by the letter T, one of its wheels is indicated only by a circle, and the other has a rim 30 within which are arranged spokes 31 that diverge from each other inward from the rim so as to produce what might be called a "cage" or extremely thick wheel having a hollow hub, or more strictly speaking two hubs whose axles 32 are journaled in the truck T; and within this cage or between its two hubs is mounted the gyroscope and its frame just above described, the axles of said hubs forming the pivots for the frame of the gyroscope. It will be clear at once that the power for driving a gyroscopic fly wheel rotating in a horizontal plane within a supporting wheel rotating in a vertical plane must be carried through the hubs or axles of the latter, either by shaft or wire, but I do not consider it necessary to illustrate this detail. The balancing action of the gyroscope in this construction is the same as in that above described, and more room is allowed on the truck for the vehicle body. It is quite obvious that the other wheel could be similarly provided with another gyroscope, although in this view I have shown the second gyroscope as mounted midway of the truck and somewhat differently constructed in a manner which will now be described.

In Figs. 8, 9, and 10 I have shown another modification or amplification of this general idea, and these views also show the step bearing somewhat lower within the frame-ring and the pivots of the latter as below the points where the supporting yoke is connected with the vehicle truck or frame. Herein the numeral 5 designates the same horizontally disposed fly wheel whose axle 6 has its lower extremity pointed as at 7 and resting in a step bearing 9 within a frame-ring 10 standing transversely of the vehicle truck T. The upper trunnion 8 is journaled in the frame-ring 10 as with the construction illustrated in Figs. 4 and 5 and extends through it and moves within a long slot 49 in a guide 48 which is connected with a horizontal ring 50. But the frame-ring 10 is pivoted at 60 within the horizontal ring 50 and the latter instead of being rigid is pivoted at 61 within the guide 48 which in the present instance extends around beneath the frame ring and its lowest point is rigidly attached to a yoke 63 whose arms pass upward and are in turn pivoted at points 64 to the vehicle truck above the pivots in the frame-ring and the horizontal ring. The result is that as the vehicle tips from side to side, the side walls of the slot 49 come into contact with the upper trunnion 8 more quickly than in the hinged construction illustrated for instance in Fig. 7 and wherein the pivots are much lower.

In Figs. 10 and 11 is shown an amplification of this last modification, wherein I have just stated that the upper trunnion 8 of the fly wheel moves in the long slot 49. In this amplification the guide 48 is continued completely around within the horizontal ring as one member and is made grooved or of U-shape in cross section as seen at 480, so that both the upper trunnion 8 and the bolt 91 at the bottom of the step bearing post 90 may travel therein as the frame-ring 10 swings forward and backward or the vehicle frame rises or falls at its ends on grades. The circular guide 48 is supported by a semi-circular yoke 481, the ends of which are pivoted in the vehicle frame, as shown at 482; and also by curved braces 483 to securely hold the same in position.

Yet another modification is shown in Figs. 12 and 13 wherein the gyroscope and its frame-ring are omitted for the sake of clearness. Here the guide 48 having the long slot for the upper trunnion is secured within a horizontal ring 50 and the action is much the same as above described for these parts. The modification in this instance consists in providing two braces 510 extending transversely from the guide 48 to and connected with the horizontal ring 50 and depending below the latter as at 511 in arms which approach the lower trunnion of the fly wheel and carry weights 512. The latter are herein shown as having set screws 513 by means of which they may be adjusted on said arms. This modification typifies but one means which may be employed for causing the fly wheel and its frame-ring to be more evenly balanced, although it will be clear that by adjusting the step-bearing up and down within the frame-ring the same end may be attained. When the step-bearing is low as seen in Figs. 8 and 9 and the pivots 60 which support the frame-ring are below the level of the vehicle truck T, the supporting yoke may be pivotally connected with this frame at the point 470 instead of rigidly connected therewith as otherwise would be necessary, and obviously this modification is possible when the weights are employed, especially if the latter be adjustable.

In Figs. 14 and 15 is shown a construction wherein the frame ring 10$^a$ has holes or pivots 10$^b$ at opposite sides and below its vertical center, and within them are mounted the trunnions 10$^c$ of a cross bar 10$^d$ which has an oval hole 10$^e$ through its center. Within this hole stands a block 9$^a$ having diametrically opposite trunnions 9$^b$ standing at right angles to the trunnion 10$^c$ and pivotally mounted in the cross bar 10$^d$, and within said block the lower trunnion 9$^c$ of the fly wheel is journaled. The top of the frame ring carries rigidly a slotted guide 10$^f$ standing at right angles to the plane in which the ring stands and curving over a line taken through the trunnions of the rock bar; and the construction is such that the entire gyroscopic wheel may swing forward and backward slightly within its frame ring as the rock bar turns upon its trunnions, and it may swing from side to side as the block 9$^a$ rocks on its trunnions 9$^b$ within the rock bar, the looseness of its upper trunnion 8$^a$ within the slotted guide 10$^f$ permitting. In this case both the wheel itself and the combined wheel and frame ring are what might be called "top heavy."

In the Figs. 16 and 17 is shown another modification wherein the gyroscopic wheel 5 has trunnions 70 and 80 projecting at equal distances above and below it so that it is neither top heavy nor pendant, but stands at the vertical center of its frame ring 10, and the guide 48$^a$ stands wholly at one side of said frame ring and has slots or grooves 49$^a$ at the top and 49$^b$ at the bottom. The length of the guide 48$^a$ is such that it is a little greater than one half the size of the frame ring 10, so that when the axle of the fly wheel stands upright as shown in Fig. 15, its trunnion 70 engages the slot or groove 49$^a$ and its trunnion 80 engages the slot or groove 49$^b$ simultaneously. When however the vehicle tips slightly or for any reason the gyroscopic wheel is thrown out of a true vertical, one trunnion passes slightly farther into its groove and the other trunnion leaves its groove entirely so that the latter has no friction and the friction of the former is not increased. The forms illustrated by this modification are merely suggestive, and it will be unnecessary to go into the details of construction further than have been described. I consider it a preferable form of construction in negotiating curves that the guide 48 shall stand either entirely forward or entirely to the rear of the axle of the gyroscopic wheel, to which extent this modification differs radically from that illustrated in Figs. 10 and 11 where the guide entirely surrounds the wheel and where friction of both trunnions thereof is constant.

Thus it will be seen that I have produced a gyroscope consisting of the fly wheel and its frame-ring, which may be said to be top-heavy because of the position of the pivots by which said ring is supported, and wherein under the various modifications and amplifications set forth the upper or lower or both trunnions of the fly wheel are permitted to have forward and backward precession within a slotted or grooved guide (itself fixed or movable) and in frictional contact with one or the other side thereof as the case may be, so that when the support or vehicle tips to either side the gyroscope rights it transversely and then rights itself longitudinally.

What is claimed as new is:

1. A gyroscope comprising a fly wheel having a normally upright axle, a frame-ring having a step-bearing in which the lower trunnion of said axle is journaled, a guide for the upper trunnion standing in a plane at an angle to that of said ring, and a movable catch having a groove at an angle to the length of said guide and adapted to be brought into temporary engagement with said upper trunnion, for the purpose set forth.

2. A gyroscope comprising a fly wheel having a normally upright axle, a frame-ring having a bearing in which the lower trunnion of said axle is journaled, a guide for the upper trunnion standing in a plane at right angles to that of said ring, and a catch mounted movably on said frame-ring and having a head provided with a groove in its under side standing at an angle to said guide and movable into temporary engagement with said upper trunnion, for the purpose set forth.

3. A gyroscope comprising a fly wheel having a normally upright axle, a frame-ring having a bearing in which the lower trunnion of said axle is journaled, a guide for the upper trunnion standing in a plane at right angles to that of said ring, and a starting device comprising a slotted catch movably mounted on the frame-ring and having a groove adapted to engage said upper trunnion at right angles to the length of said guide, and pins in said ring loosely engaging the slots of the catch.

4. A gyroscope comprising a fly wheel having a fixed axle, a frame ring pivotally supported at diametrically opposite points, a bearing for one end of said axle carried by the ring between said points, and a guide carried by the ring opposite said bearing and having a slot for the other end of the axle extending across and to both sides of the ring.

5. A gyroscope comprising a fly wheel having a normally upright axle through it, a frame pivotally supported in a normally upright plane across an unstable support, a bearing within the frame for the lower end of said axle, and a plate rigidly mounted upon and across the top of the frame and having a slot for the upper trunnion of said axle.

6. A gyroscope comprising a fly wheel having a normally upright axle through it, a frame pivotally supported in a normally upright plane across an unstable support, a bearing within the frame for the lower end of said axle, a guide carried rigidly by said frame and having a slot for the upper trunnion of the axle, which slot stands in a plane at right angles to that of the frame, and means for locking said trunnion temporarily at the mid-length of such slot.

7. A gyroscope comprising a normally upright frame ring pivotally mounted across an unstable support, a cross bar pivoted across the interior of the ring below the pivotal line of the latter and having a hole through its center, a block mounted in such hole on pivots transverse to the line of said bar and containing a step bearing, a slotted guide extending across the top of the frame, a fly wheel, and an axle through it whose lower trunnion is mounted in said bearing and whose upper trunnion is movably disposed in said guide.

In testimony whereof I have hereunto set my hand in presence of two subscribing witnesses.

EDWARD N. DARROW.

Witnesses:
MYRON H. NICHOLS,
RAYMOND C. SMITH.